US006654216B2

(12) United States Patent
Horvath et al.

(10) Patent No.: US 6,654,216 B2
(45) Date of Patent: Nov. 25, 2003

(54) DISTRIBUTED MONITORING AND PROTECTION SYSTEM FOR A DISTRIBUTED POWER NETWORK

(75) Inventors: Vincent Victor Horvath, Bethlehem, PA (US); James Allen Butt, Macungie, PA (US)

(73) Assignee: Bitronics, Inc., Bethlehem, PA (US)

( * ) Notice: Subject to any disclaimer, the term of this patent is extended or adjusted under 35 U.S.C. 154(b) by 57 days.

(21) Appl. No.: 10/262,126

(22) Filed: Oct. 1, 2002

(65) Prior Publication Data

US 2003/0067725 A1 Apr. 10, 2003

Related U.S. Application Data

(63) Continuation of application No. 09/457,495, filed on Dec. 9, 1999.
(60) Provisional application No. 60/119,947, filed on Feb. 12, 1999.

(51) Int. Cl.[7] .............................. H02H 3/00; H02H 7/00
(52) U.S. Cl. .............................. 361/65; 361/42; 361/47; 361/62; 361/93.1; 361/93.9; 361/94; 361/95
(58) Field of Search ........................ 361/42, 47, 62–75, 361/93.1, 93.9, 94–97

(56) References Cited

U.S. PATENT DOCUMENTS

| 4,672,501 | A | 6/1987 | Bilac et al. | 361/96 |
|---|---|---|---|---|
| 4,760,487 | A | 7/1988 | Kwong et al. | 361/64 |
| 4,972,290 | A | 11/1990 | Sun et al. | 361/64 |
| 5,170,310 | A | 12/1992 | Studtmann et al. | 361/94 |
| 5,237,511 | A | 8/1993 | Caird et al. | 361/86 |
| 5,341,268 | A | 8/1994 | Ishiguro et al. | 361/62 |
| 5,619,392 | A | 4/1997 | Bertsch et al. | 361/65 |
| 5,629,825 | A | 5/1997 | Wallis et al. | 361/64 |
| 5,793,750 | A | 8/1998 | Schweitzer, III et al. | 361/61 |
| 6,008,971 | A | 12/1999 | Duba et al. | 361/64 |
| 6,496,342 | B1 | * 12/2002 | Horvath et al. | 361/65 |

FOREIGN PATENT DOCUMENTS

| EP | 0718948 A2 | 6/1996 |
|---|---|---|
| EP | 0723325 A1 | 7/1996 |

OTHER PUBLICATIONS

S. Shelton et al. "Maui Electric Follows HECO Lead on PLC–Based Automation" *Utility Automation* Nov./Dec. 1998 (2 pages).
International Search Report for PCT/US00/00888 dated Jun. 2, 2000.
"Microprocessor–based numerical control and protection for substation—New, intelligent line terminals", 8006 ABB Review, (1992), No. 7/8, Zurich, CH, pp. 9–18.
Bailey et al., "Static–Digital Overcurrent Relays Permit Enhanced Protection", IEEE, (1998), pp. 25–32.

* cited by examiner

Primary Examiner—Stephen W. Jackson
(74) Attorney, Agent, or Firm—RatnerPrestia (57) ABSTRACT

A distributed monitoring and protection system for a distributed power network. The system includes a plurality of high-speed measuring units (MUs), wherein each MU is coupled to a power line to measure values of electrical parameters of the power line. Electrical parameters, such as current, voltage, power and frequency are measured by the MUs. The MUs communicate with a control unit (CU) over a high-speed communications network. The CU includes a processor executing algorithms for evaluating the measured parameters to determine the status of the power network and the MUs. The processor also executes fault detection and isolation by comparing the measured values against predetermined threshold values. When a fault is detected by the CU, protective action, such as tripping of a circuit breaker, may be initiated by the CU directly or by transmitting the tripping command over the high speed data network to a local MU. The local MU may then trip the circuit breaker. The availability at the CU of concurrent measurements from the plurality of MUs enables improved coordination and sequencing of protective actions.

2 Claims, 10 Drawing Sheets

DISTRIBUTED MONITORING AND PROTECTION SYSTEM FOR A DISTRIBUTED POWER NETWORK

RELATED APPLICATIONS

This application claims priority of U.S. Provisional Application Ser. No. 60/119,947, filed on Feb. 12, 1999 and is a continuation of Ser No. 09/457,495 filed Dec 9, 1999.

BACKGROUND OF THE INVENTION

Electric power is typically conveyed from electric power generators to users via a network of transmission and distribution circuits. Electric power is commonly generated as three-phase alternating current (AC) at a frequency of 50 Hz or 60 Hz. Each phase requires a current-carrying wire, and has voltage and current nominally lagging or leading any other phase by 120 degrees. Power is generated, for example, at 4 kV voltage, stepped up to 128 kV or 750 kV for transmission over long distances, and then stepped down in stages to 4 kV or 33 kV for distribution to various neighborhoods. Voltage may further be reduced, by pole-mounted or pad-mounted transformers, for delivery at 120V and 240V to residential and commercial users within these neighborhoods.

Large voltage transformations typically take place at transmission or distribution substations. Functions of the substations may include voltage transformation, regulation and control, power-factor (e.g. capacitor-bank) and load balancing, monitoring, and protection of hardware. Proper monitoring and protection is extremely important in preventing damage to equipment, reducing hazards and minimizing the number of users who may have to be disconnected from an electric distribution network due to damage or equipment failures. Conventional protection systems include fuses and relays, each having predetermined response times and zones of control to minimize propagation of failures.

Fuses are located throughout the electric distribution network and disconnect circuits experiencing excessive current flow due to equipment failure, storm damage, etc. Each fuse is selected with a predetermined response time to accommodate the need of the circuit being protected. The fuse does not blow under normal operation or a momentary over-current condition, but is designed to blow under a true, sustained fault situation. Relays are similarly used to detect faults and initiate disconnection of faulted circuits; relays, however, are typically more complex than a fuse. A relay typically includes a voltage and/or current sensor and a set of electrical contacts driven by the sensor. Electrical contacts in the relay may be connected to circuit breakers which, in turn, physically disconnect faulted lines or circuits when the breaker is opened ("tripped"). Modern relays may use solid-state switches in place of electrical contacts.

There are many types of relays, each having different characteristics. Depending on its electrical and physical characteristics, the response time of the relay may be varied. For example, a relay may be made to trip a breaker in one or two cycles of the 50 Hz–60 Hz frequency when it detects excessive current. This type of relay is known as an instantaneous over-current (OC) relay (Type 50). Another type of relay is the time-over-current (TOC) relay (Type 51). The TOC relay may include an adjustable delay so that it may respond quickly to large over-current conditions, but more slowly to small over-current conditions. Predetermined response curves (TOC Curves) are usually provided by the manufacturer of the relay to aid in the selection and adjustment of a Type 51 relay.

Small current overloads in a local circuit may be tolerated if the magnitude and duration of the overload are not expected to damage the distribution network. For example, temporary overloads lasting a few hours may be acceptable in order to maintain service to users during a hot summer day when peak load periods are expected. Concurrent with maintaining service during expected overload conditions, the relay must still effectively protect the network in the event of a true, sustained circuit fault. Some networks may use a Type 50 relay in parallel with a Type 51 relay to provide better response to large fault currents, while not over-reacting to small, temporary overloads.

Relays are installed at various locations in a network. With respect to electromechanical relays, each protective function for one phase of a circuit generally requires a separate relay. Providing separate relays for each function per phase is expensive, because of space requirements and installation/wiring costs for so many relays. More recent designs provide for microprocessor-based relays. Microprocessor-based relays are able to combine protective functions for all three phases into one unit. Furthermore, microprocessor-based relays may be remotely reset and adjusted to provide responses that vary depending on the nature of the electrical load during the year. For example, TOC curves and operating points may be changed in anticipation of changes in loads.

A conventional relay, either electromechanical or microprocessor, only senses current or voltage on a circuit to which the relay is connected and only disconnects a breaker for that circuit. The relay does not communicate its measurements with any other relay during the period in which it senses a fault and trips the breaker. Some relays may communicate status information, but do not share measurements to make protective decisions. Using TOC curves, for example, is one of the important ways to limit the relay's "zone of control". For example, relays protecting the spokes or "feeders" of a radially distributed power network may be adjusted to respond faster (and at lower trip currents) than relays protecting the hub of the network. In this manner, a faulted feeder may be disconnected before disconnecting the hub and, consequently, all the remaining feeders.

Figure 1:
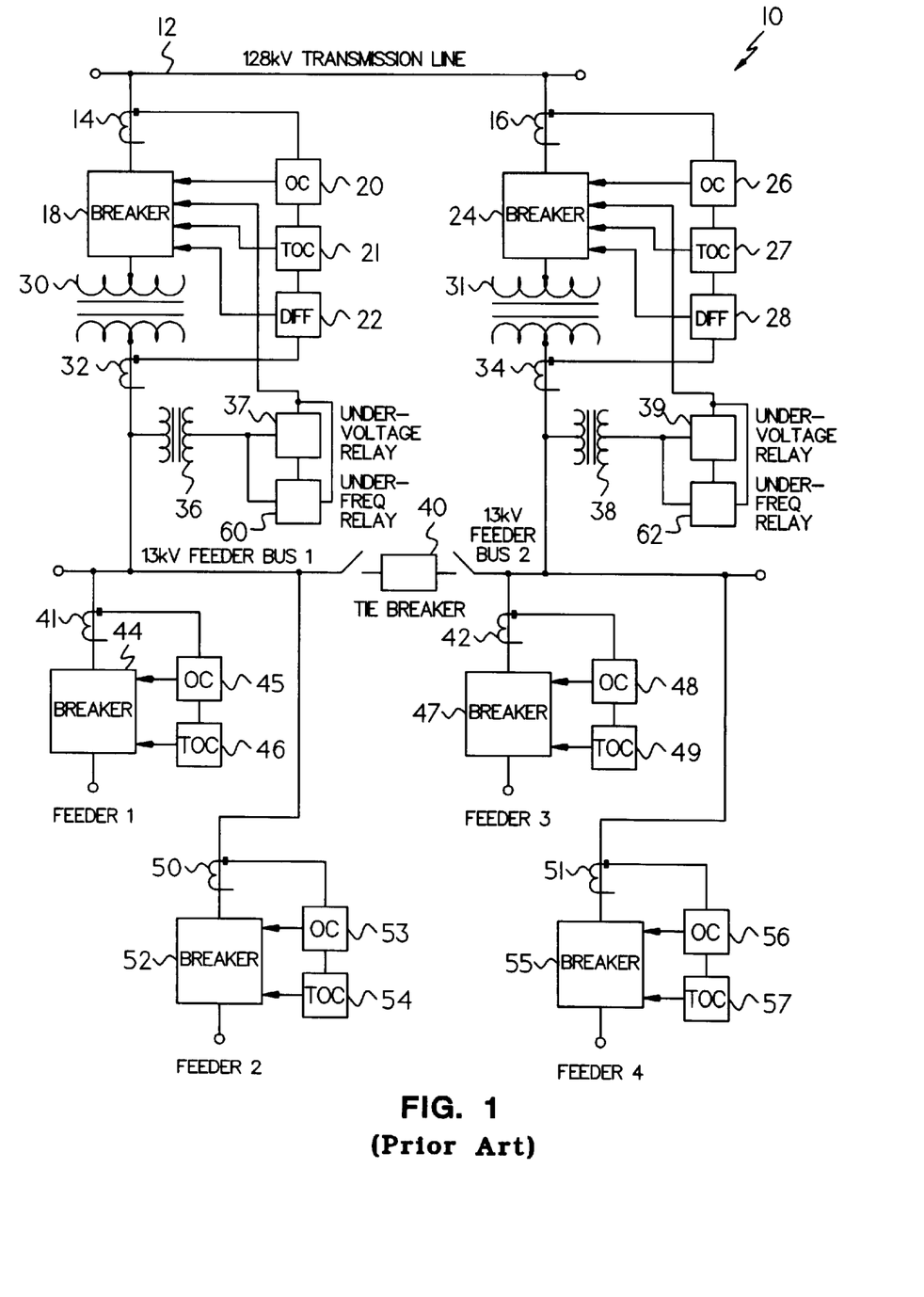
FIG. 1 is a schematic diagram of a conventional distributed power network.

FIG. 1 illustrates a conventional electric utility network protected by relays. As shown, a 128 kV transmission line feeds the primary windings of each of two power transformers 30 and 31 by way of circuit breakers 18 and 24, respectively. The secondary of each of the two power transformers 30 and 31 feeds electric power at 13 kV to feeder bus 1 and feeder bus 2, respectively. Feeder bus 1 transmits electric power at 13 kV by way of two circuit breakers 44 and 52 to two feeders, feeder #1 and feeder #2. Similarly, feeder bus 2 transmits electric power by way of two circuit breakers 47 and 55 to two feeders, feeder #3 and feeder #4. Feeders #1-#4 provide power, for example, to a neighborhood, factory or shopping center. Tie-breaker 40 provides an alternative path of electric power in the event that power transformer 30 or power transformer 31 is taken out of service. It will be appreciated that each power line shown in FIG. 1 represents three power lines corresponding to the three phases of electric power. Depending on the network, there may actually be three times the number of breakers and relays shown in FIG. 1.

Also shown in FIG. 1 are current transformers 14, 16, 32, 34, 41, 42, 50 and 51 feeding current to various relays. The current transformers each provide an output current in proportion to the current flowing through each line. For example, the current flowing through a line may be 1200 amperes, whereas the corresponding current transformer may provide an output of 5 amperes. As shown, current transformer 14 provides current to OC relay 20, TOC relay 21 and differential relay 22. Differential relay 22, which also senses current from current transformer 32, reacts to an imbalance between current flowing into and out of power transformer 30. OC relay 20, TOC relay 21 and differential relay 22 control breaker 18, and each may individually trip the breaker if a predetermined condition occurs. Similarly, OC relay 26, TOC relay 27 and differential relay 28 control breaker 24. OC relay 45 and TOC relay 46 control breaker 44. OC relay 48 and TOC relay 49 control breaker 47. OC relay 53 and TOC relay 54 control breaker 50. OC relay 56 and TOC relay 57 control breaker 55.

Also shown in FIG. 1 are under-voltage relays 37 and 39 connected to potential transformers 36 and 38. Under-voltage relays 37 and 39 are shown connected to the secondary of each potential transformer to protect against transformer failures or other failures in the circuits. A potential transformer provides an output in proportion to voltage on the feeder bus, but at a stepped down voltage level. For example, a bus voltage of 13 kV may be stepped down to an output voltage of 120V. Two additional relays shown are under-frequency relays 60 and 62 controlling breakers 18 and 24, respectively. An under-frequency relay protects against excessive line frequency deviations.

As discussed above, conventional protection in a network requires that relays be selected and adjusted so that a fault in the network may be contained. For example, if there is a fault on feeder #1 at a local neighborhood (at the spoke level), relays 45 or 46 should trip breaker 44 before relay 20, 21, 22, 37 or 60 causes breaker 18 to trip (at the hub level). If the relays have been adjusted properly, feeder #1 is disconnected, but feeder #2 continues to provide electric power. If the relays on feeder #1, however, do not trip their associated breaker fast enough, the relays ahead of power transformer 30 will likely trip their associated breaker, thereby cutting power to both feeder #1 and feeder #2. Similarly, if the relay ahead of power transformer 30 do not trip due to a fault at the power transformer or on feeder #1, the entire transmission line and substation may be shut down by another relay positioned higher in the hierarchy of the network.

A need exists, therefore, for an apparatus and method for improved detection of and protection against electric faults in a power network. A need also exists for eliminating the complexity of selecting and adjusting the tripping characteristics for relays and breakers in a power network. A need also exists for an improved method for coordinating and sequencing protective actions and breakers in a power network.

SUMMARY OF THE INVENTION

To meet this and other needs, and in view of its purposes, the present invention provides a distributed monitoring and protection system for a distributed power network. The power network has a plurality of lines for transmitting electric power from a station with circuit breakers included in the lines. The distributed monitoring and protection system includes at least one monitoring unit coupled to at least one of the plurality of power lines for measuring electrical parameters of the power line; and at least one control unit communicating over a data network with the monitoring unit and receiving measured electrical parameters from the monitoring unit. The control unit includes a processor for analyzing the measured electrical parameters and tripping at least one of the circuit breakers when a fault in the power network is determined.

The measured electrical parameters include values as a function of time for current, voltage, power, frequency, power factor, and harmonic components of the current and voltage in the power line. The measurements are obtained by the monitoring unit, communicated over the data network, and analyzed by the control unit in a sufficiently short time to activate protective devices and thereby limit the effects of a fault in the power network. Preferably, the measurement and communication times are each one cycle or less of the alternating current power network.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

An improved monitoring and protection system for a distributed power network will now be described. In the preferred embodiment, the system replaces the conventional relays located at various nodes of a power network. As will be explained in detail, the exemplary distributed monitoring and protection system includes multiple measurement devices (referred to herein as MUs) installed at various nodes along a distributed power network. Each MU may be a high-speed measurement device that includes a microprocessor for calculating and updating measurements within a period that is preferably less than an electrical cycle (for example at a frequency of 50 Hz–60 Hz). The combined measurement and communication periods should be less than the time required to initiate a protective action. Each MU may also communicate information to a local-area or wide-area data network. Unlike conventional protective relay systems, decisions to activate or trip a circuit breaker are made by a centralized control unit or by separate control units, based on shared information from the network.

These control units (referred to herein as CUs) may also be capable of high-speed processing and evaluation of data sent by the MUs, by using for example ladder-logic, fuzzy-logic, or other decision-making algorithms. Furthermore, the CUs may also process and combine substantially concurrent measurements provided by other MUs in the network. After making a decision, a CU may provide a control signal to a circuit breaker to trip the circuit breaker. The control signal may be sent to the circuit breaker, by a high speed network connected to the circuit breaker, such as that connecting the MUs, or the signal may be sent to another control device equipped to receive trip commands from the network. In another embodiment, the control signal may be sent to the circuit breaker by direct wire connection.

Figure 2:
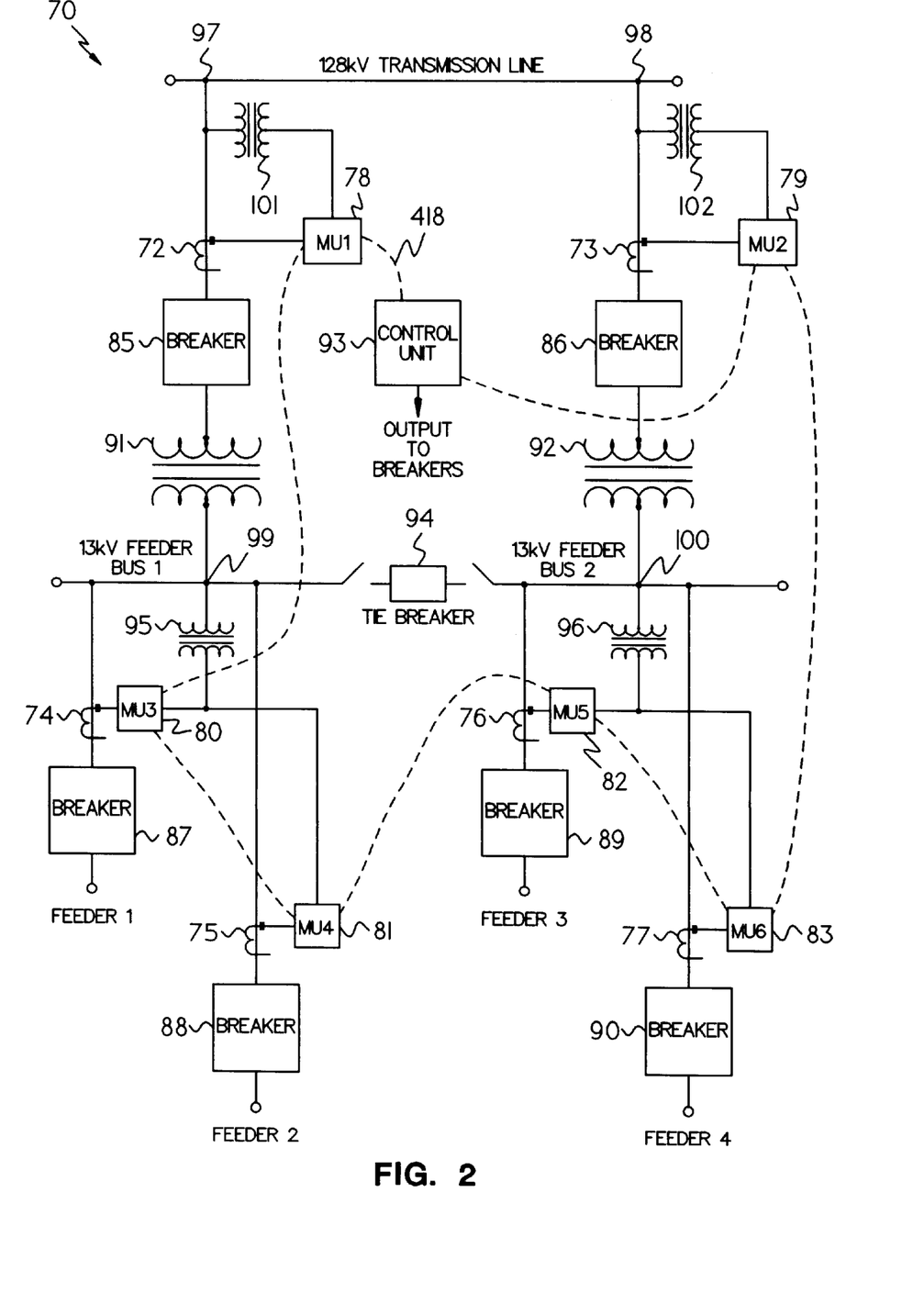
FIG. 2 is a schematic diagram of the distributed monitoring and protection system of the present invention coupled to a distributed power network.

FIG. 2 shows an embodiment of a monitoring and protection system for a distributed power network 70. As shown, MUs are connected to current transformers and potential transformers at various nodes. Specifically, MU 1 (designated 78) is connected to the secondary of current transformer 72 and the secondary of potential transformer 101. The primary of current transformer 72 and the primary of potential transformer 101 are connected to node 97 of the 128 kV transmission line. Similarly, MUs 2–6 (designated 79–83, respectively) are connected to the secondary of respective current transformers 73–77 and the secondary of respective potential transformers 102, 95 (two connections to the center tap) and 96 (two connections to the center tap). The primary of current transformer 73 and the primary of potential transformer 102 are connected to node 98 of the 128 kV transmission line. The primaries of transformers 74, 95 and 75 are connected to node 99 of 13 kV feeder bus 1 and the primaries of transformers 76, 96 and 77 are connected to node 100 of 13 kV feeder bus 2.

It will be appreciated that other embodiments of an MU may also be included. For example, it is not necessary that an MU include both a current transformer (CT) and a potential transformer (PT). The MU may be directly connected to the utility system, or may be coupled via optical isolation devices, radio, etc. One approach may be to couple each MU to each of the three phase wires using a CT on each phase. PTs may or may not be needed, depending on the protection scheme and the types of faults.

Also shown in FIG. 2 are six circuit breakers 85–90 having been interposed to break connections to power transformers 91 and 92 and line feeders #1–4, respectively.

Each MU may sense current and voltage on one or more electrical lines via respective coupling transformers, and may update the measurements every cycle or less (at 50 Hz–60 Hz frequency). The MU may process these measurements, calculate other values, and transmit information to a centralized CU, for example CU 93. Each MU of this embodiment may be functionally identical to every other MU in the network.

Figure 3A:
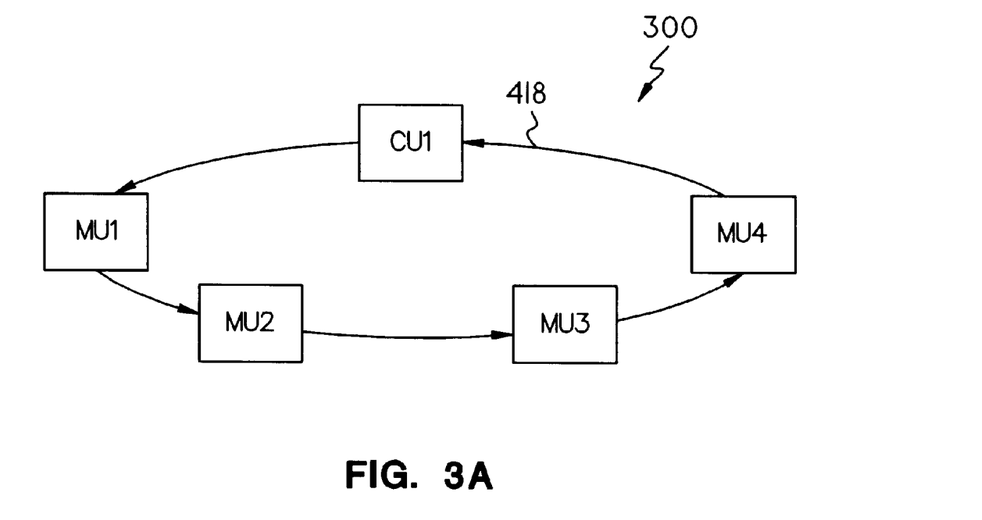
FIGS. 3A and 3B illustrate communications over a data network of the present invention using a ring topology and a star topology, respectively.
Figure 3B:
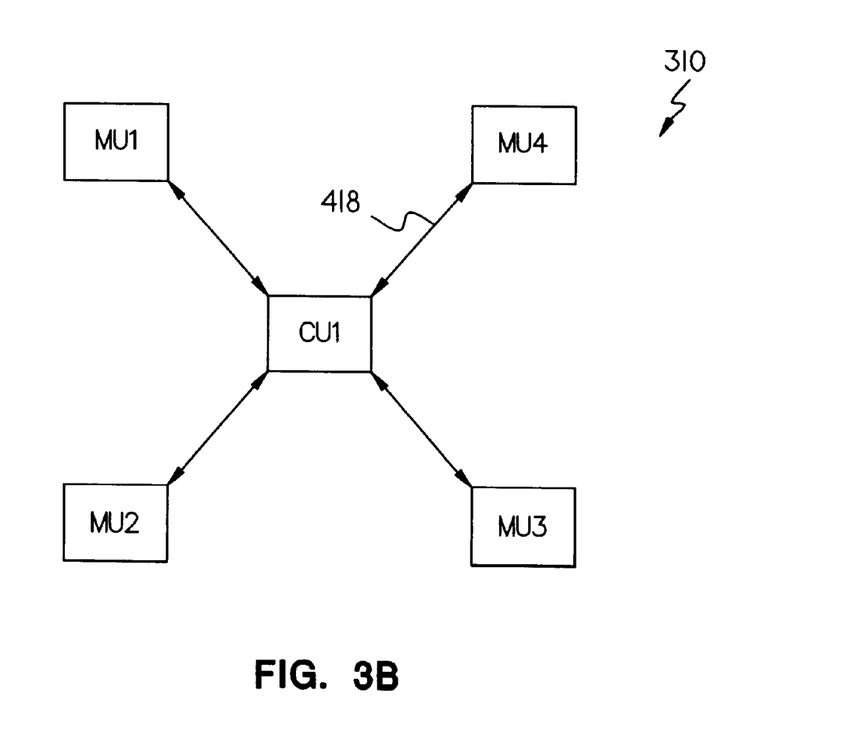

MUs may communicate with a CU using a protocol, such as TCP/IP or MMS, that allows high-speed communication of data. For example, a monitoring and protection system may use conventional Ethernet hardware and MMS communication protocol. System communications speed may range from 10 Mb/sec to 100 Mb/sec, depending on the speed requirements for protection, and depending if copper wire, coaxial cable, fiber-optics, or another medium is used. Communications may be accomplished by using a ring topology, a star topology, or any other topology suitable to the speed requirements of the network. For example, FIGS. 3A and 3B respectively show examples of a ring topology 300 and a star topology 310. As shown in FIG. 3A, information is cycled counter-clockwise and sequentially from CU1 to MU 1, MU 1 to MU 2, etc. FIG. 3B, on the other hand, shows CU1 communicating individually with each of the four MUs.

Referring again to FIG. 2, the monitoring and protection system is interconnected using a ring topology. For example, MU 1 transmits information to MU 3, MU 3 transmits information to MU 4, and so on, closing the loop with CU 93 transmitting information to MU 1. In this manner, data are shared by all the MUs and the CU. In other embodiments, an MU may simultaneously broadcast measurements to all other MUs and CUs in the system.

FIG. 2 shows a single CU controlling the protective devices; in this embodiment breakers designated 85–90. It will be appreciated that the CU may be physically located in a substation or remotely from the substation. The CU may be a high-speed programmable logic controller (PLC), a general-purpose computer, or a personal computer (PC) connected to the data network. Although not shown in the figure, multiple CUs may be connected to the network, each sharing measurements provided by the MUs. Multiple CUs may provide added protection due to redundancy of operation; multiple CUs may also ease loading and throughput requirements by dividing decision-making tasks among the multiple CUs.

In one exemplary embodiment of the distributed monitoring and protection system, MU measurements may be made available to the CU, so that functions conventionally provided by relays may be performed by the CU. For example, the CU may process and analyze current measurements, and if any single value exceeds a preset level, the CU may initiate a signal to trip the appropriate breaker. In another example, current measurements from MU 3 and MU 4 shown in FIG. 2 may be combined by CU 93 and compared to measurements from MU 1 to obtain differential current (current flowing from one branch should equal the sum of currents flowing into two branches; if not, there is a possible transformer or bus failure, and protective action should be taken). An algorithm in the CU may perform the protection function conventionally performed by a differential current relay. Similarly, frequency measurements provided by MU 1 may be used by another algorithm in the CU to emulate an under-frequency relay.

Furthermore, concurrent measurements provided by several MUs may be compared or averaged by a CU to provide greater confidence in an individual measurement provided by an MU. Moreover, missing measurements from an MU may be derived by a CU from other measurements being shared in the network. For example, if MU 3 is disabled, the CU may estimate MU 3 measurements by using measurements provided by MU 1 and MU 4 (current flowing from one branch should equal the sum of currents flowing into two branches).

Unlike a conventional relay whose TOC characteristics must be predetermined, the monitoring and protection system of the present invention permits protection algorithms to make decisions based on dynamic TOC characteristics. For example, different TOC curves may be selected by the algorithms in the CU depending on the load imposed at each feeder. The present invention also provides dynamic OC trip settings for a circuit breaker. This is described later in greater detail.

In one embodiment, the MU may measure and process voltage, current, power, frequency, etc., on a power line. For example, MU 1 measures and processes the voltage, current, power, frequency, etc., on the 128 kV transmission line by way of current transformer 72 and potential transformer 101, as shown in FIG. 2. The measurements may be updated in less than an electrical cycle, and shared among the other MUs and CU 93.

Figure 4:
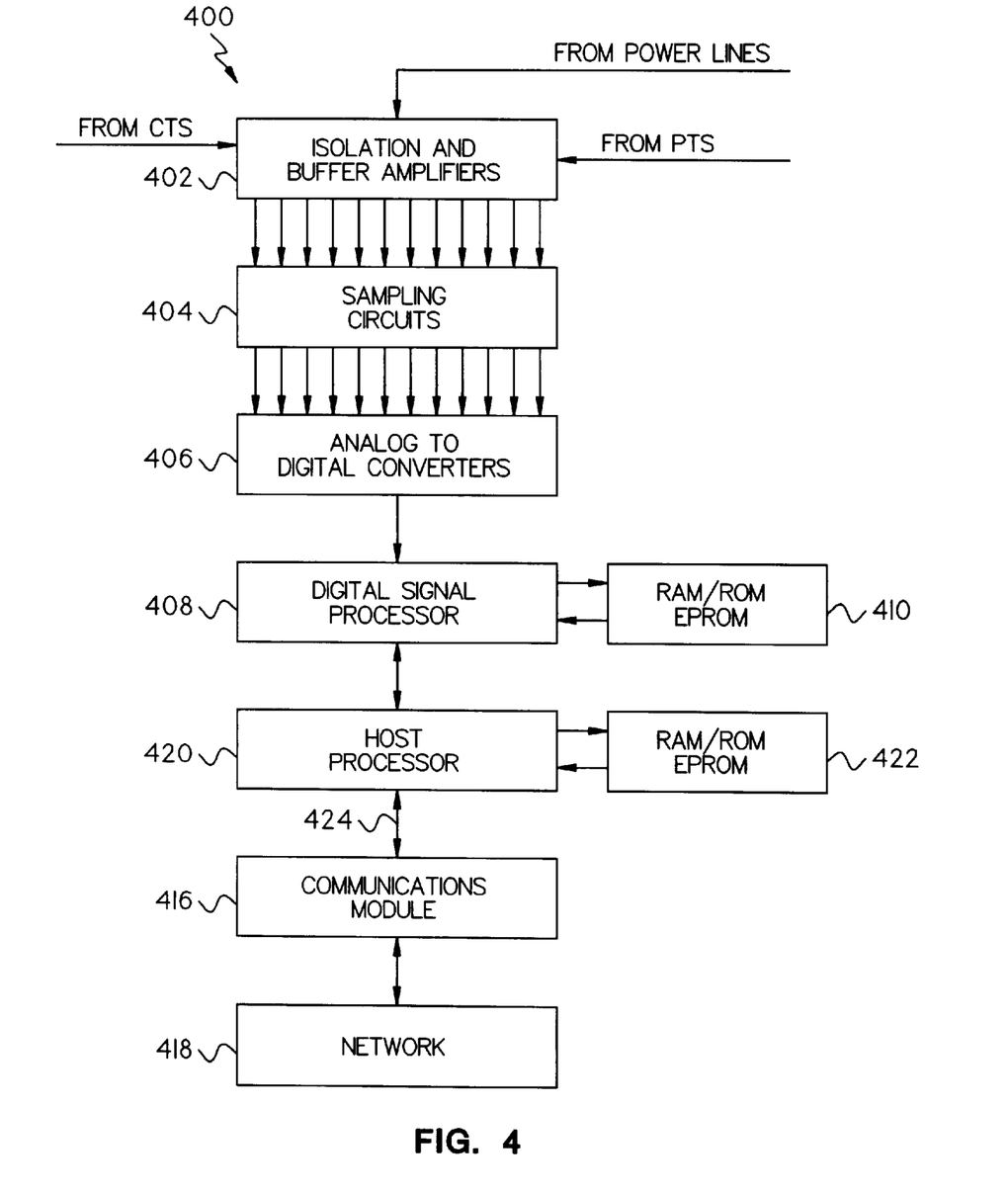
FIG. 4 is a block diagram of a monitoring unit (MU) of the present invention.

An exemplary embodiment of a MU is illustrated in FIG. 4. As shown, module 402 includes isolation and buffer amplifiers for isolating and buffering input signals from the power network. The input signals may be from the secondary of one or several current transformers (CTs) and the secondary of one or several power transformers (PTs). It will be appreciated that input signals may also be provided by direct connections to a power line by way of other coupling devices or transducers such as fiber-optic current sensors. Module 402 may isolate and buffer single-phase and multiple-phase voltages and currents in the power distribution system.

The MU may also include one or more internal CTs and PTs. Internal CTs, for example, may provide galvanic isolation from an externally applied current signal. In this manner, any "common" high-voltage transient signals present on the input terminals to the MU may be isolated from the internal circuits of the MU. Furthermore, differential transients present on the input terminals may also be limited on a CT's secondary windings by way of internal voltage clamping components. It may also be desirable for a CT to provide accurate representations of signals applied to the input terminals even in the presence of fault currents exceeding nominal current values by more than twenty times. It may further be desirable for an internal CT to have sufficient bandwidth to obtain harmonic components of the input signals. Harmonic components of input signals may, for example, be important for calculating RMS values of the input signals.

The isolation and buffer amplifiers may use internal high-impedance resistive dividers (RDs) to proportionally step down the voltage signals applied to the input terminals of the MU. The RDs may not, however, provide galvanic isolation as do transformers and may require clamping components to safely limit transients.

Module 404 includes sampling circuits adapted to interface with the isolation and buffer amplifiers of module 402. Module 406 includes one or several analog-to-digital (A/D) converters for digitizing the output signals from module 404. In general, the signals may be sampled multiple times during a quarter-cycle of the generated frequency from the power station (50 Hz–60 Hz). It may also be desirable to use a sampling process that allows for simultaneous capture of sampled values of the input signals, thereby synchronizing the measurements.

The sampling circuits shown in FIG. 4 may include, for example, four separate current inputs and six separate voltage inputs. Other inputs may also be added to measure ancillary AC or DC voltages. Each input signal may be sampled at a rate that captures the fundamental and harmonic content of the input signal, so that RMS values and peak values may accurately be calculated. Furthermore, the sampling rate may be sufficiently high to allow sub-cycle calculations and updates of RMS and peak values of an input signal, for example. In this manner, data may be communicated to the CU or another MU in the network at the appropriate speed. For example, each current and voltage input signal may be sampled at a rate of 128 samples per cycle. This rate satisfies the Nyquist criteria for capturing waveform components up to the 63$^{rd}$ harmonic.

Sampling circuits 404 may sample all input signals at substantially the same time. Simultaneous sampling of all input signals avoids introducing errors in subsequent calculations due to skew among corresponding samples. After input signals are sampled, the signals may be held or stored as analog values on capacitors (not shown). The signals stored on the capacitors are then converted to digital signals by analog-to-digital (A/D) converters. The digitized sampled signals may then be sent to a high-speed digital signal processor (DSP) 408, for example.

Also shown is processor 408, which may be a microprocessor or a digital signal processor (DSP). Processor 408, by using memory 410, operates on the digitized input signals and calculates parameters suitable for use in protection algorithms. For example, multiple samples of a signal may be combined to obtain a true RMS value of the signal. Samples may be accumulated in a buffer memory of the DSP for a predetermined period, for example a cycle or less. True RMS current and true RMS voltage values may be calculated from the most recent sample set and previously acquired sample sets by using well-known algorithms for processing discrete samples. $I_{rms}$ may be calculated, for example, using the following formula:

$$I_{rms} = \sqrt{\sum_n \frac{I_i^2}{n}}$$

where n is the number of samples per cycle, and $I_{th}$ is the value of the $i^{th}$ sample. (this formula applies to symmetric AC signals having no DC component.)

The DSP may also calculate real and reactive power by multiplying voltage samples with corresponding current samples and combining the results to determine power values and direction of power flow. Calculations of frequency values, harmonic component values, phase values, and other values may be derived by using Fast Fourier Transform (FFT) principles. Frequency, harmonic components, phase measurements, and other parameters not associated with a fast-acting protection algorithm may be updated less frequently than once per cycle.

All values calculated by the DSP may be communicated to host processor 420, which may be a Host Microprocessor (HM). Communications between the DSP and the HM may be by way of a compact PCI bus, for example, which provides high-speed data communications between various modules of a MU. The HM may organize and store information in memory 422, for example. The HM may be an Intel 486 or higher class CPU, or an AMD AM5X86 family CPU.

The HM may convey data via a compact PCI bus 424, for example, to communications module 416. Communications module 416 may, for example, be the Ethernet. It will be appreciated that the HM may format data into packets, as required by its software protocol, and sent the packets of data to communications module 416. The communications module may add identification and error-correction code to the data, and send the data packets to network 418. In a similar manner, data packets received from the network by the communications module may be checked for errors, decoded, and sent to the HM via compact PCI bus 424. An exemplary communications module may communicate on the network with 10/100 Mb/sec Ethernet (copper) or fiber-optic cable. Other communications modules may also be used to meet other possible physical communication standards, such as RS232 and RS485. A variety of software protocols may be adapted for use by the communications module, for example, UCA2.0, Modbus, Modbus Plus or DNP3.0. In another embodiment, the function of the communications module may be performed by the HM or by the DSP.

The network may be a Local Area Network (LAN) or a Wide Area Network (WAN). The LAN may be preferred to protect a small distribution substation, whereas the WAN may be preferred to protect a widely distributed power network.

Table 1 lists the characteristics of an exemplary embodiment of a MU in accordance with the invention.

TABLE 1

Exemplary Characteristics of a Monitoring Unit (MU)

| | |
|---|---|
| Input Signals | |
| Amperes: | 4 Inputs. 3 Phase Currents and 1 Neutral 0 to 5 Aac nominal with continuous overload to 15 Aac, Linear to 100 A symmetrical at all rated temperatures. 500 Aac for 1 second. 2500 Vac isolation, minimum. Burden: <0.04 VA @ 5 Aac. 0 to 1 Aac nominal (Programmable Option) with continuous overload to 3 Aac, Linear to 20 A symmetrical at all rated temperatures. 500 Aac for 1 second. 2500 Vac isolation, minimum. Burden: <0.02 VA @ 1 Aac. |
| Volts: | 6 Inputs, Programmable Range, 20–75 Hz Range 0 to 540 Vac, 277 $V_{L-N}$/480 $V_{L-L}$ nom. 500 Vac min isolation. Burden: <0.03 VA @ 480 Vac. |
| Auxiliary: | Range 0 to 330 Vdc. 5000 Vac min isolation. Impedance: >2 MOhm differential and to ground. |
| Accuracy: | Accuracies are at nominal Frequency and 20° C. Temperature Coefficient-<25 ppm. All values are true RMS and include components to the 63$^{rd}$ Harmonic. Voltage: AC - Better than 0.2% of reading (20% to 100% of range). DC - +/- 0.2 V (24 to 250 Vdc) Current: Better than 0.2% of reading (0.5 A to 10.0 A, 5 A range) <1% over entire range Power: Better than 0.2% of reading (20% to 100% of range, 1 PF to 0.7 PF) Frequency: +/- 0.01 Hertz, 20–75 Hertz Phase Angle: +/- 0.2 degrees Trims for phase and gain on all AC inputs (fundamental only) |
| Signal Frequency: | <20 Hz to 75 Hz Fundamental |
| Sampling: | 128 Samples per cycle |
| Demand Interval: | Programmable Time Constant and type of window |
| Communications: | Physical: RS-232 - 9600 to 38400 baud RS-485 - 9600 to 38400 baud Modbus Plus Ethernet (Copper, Fiber, 10T/100T) Protocol: DNP 3.0 Modbus Modbus/TCP-IP Modbus Plus UCA-2 |
| Data Update Rate: | RMS current and voltage values calculated every ¼-cycle. Frequency, power, other values calculated every cycle or faster. |
| Data Logging: | Non-volatile memory Interval programmable 1 s–1 hr Values programmable |
| Waveform Capture: | 16 to 128 Samples per cycle (programmable) 60 cycles per event 8 channels (3 V, 4 I, Bat) |
| Remote (network), Internal or External trigger | |
| Power Requirements: | Specified range or Universal AC/DC Options |
| Operating Temperature: | –40 C. to 70 C. |
| Installation Category: | IC III (Distribution Level), Pollution Degree 2 |
| UL: | 3111 |
| Transient: | ANSI/IEEE C62.41 (location cat. B3) on PTs, CTs, and Power IEEE C37.90.1 Ring wave and Fast transient IEEE C37.90.2 |

TABLE 1-continued

Exemplary Characteristics of a Monitoring Unit (MU)

Figure 5:
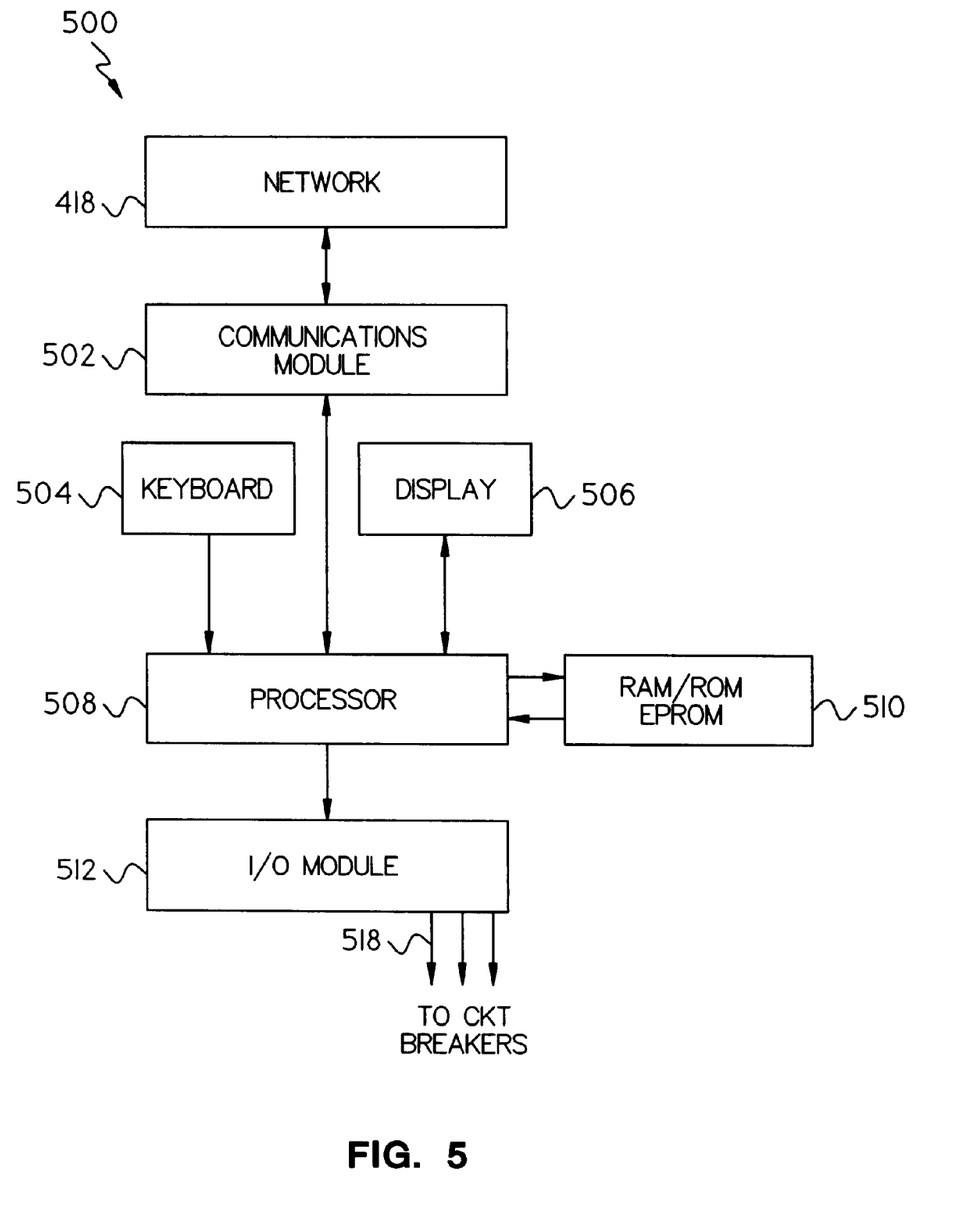
FIG. 5 is a block diagram of a control unit (CU) of the present invention.

An exemplary CU is shown in FIG. 5, as CU 500. Communications module 502 may interface with a suitable high speed data link compatible with network 418, as already described, and may reformat the data for input to processor 508. Processor 508 may be a host processor, a microcomputer, or a PC having the throughput and processing speeds necessary for the monitoring and protection of the power network. In the preferred embodiment, the processor must be capable of processing the input data stream and making a decision in time to limit damage and fault propagation. Protective decisions may be made in a few cycles or less (50 Hz–60 Hz frequency). It will be appreciated that the duration is based on the time considerations of an over-current condition due to a fault. The number of AC cycles is an indirect way of describing the time considerations. In the field of protection, the phrases "less than one cycle" and "sub-cycle" imply that the protection operation is "fast". But the actual settings may be determined on the basis of the electric distribution system configuration and by the need to coordinate among sequential protective operations.

The processor may make a decision in a predetermined time duration. The predetermined time duration may be simply a preset number such as three AC cycles or 50 milliseconds, or may be a calculated number based on real time analysis of multiple measured values provided by one or more MUs. This may be as short as two or three cycles, but may also be many cycles when TOC calculations (for example) are used.

Processing may include comparing values against thresholds, integrating values over time and determining status of circuit breakers in the protection network. By examining the input data stream using a single real time clock, the processor may initiate protective actions and coordinate sequential protective actions. A user interface may be provided via keyboard 504 and display 506. Keyboard 504 and display 506, as well as memory 510, may be conventional devices interfacing with processor 508.

Processor 508 may also interface with I/O module 512 to provide tripping commands by direct connections (lines 518) to circuit breakers. I/O module 512 may be any conventional circuit supplying the appropriate voltage(s) to trip one or more circuit breakers. For example, line 518 may be directly connected to circuit breaker 85 (FIG. 2). In another embodiment, CU 500 may control a circuit breaker via communications module 502 over high-speed network 418. Communications module 502 may format the tripping commands as messages over network 418 to a MU located near a faulty circuit. The MU may then actuate the circuit breaker to disconnect the faulty circuit. For example, MU 1 may have a direct connection to breaker 85 (FIG. 2). In another embodiment, a trip command may be sent over network 418 directly to a circuit breaker equipped with a high-speed communication module.

A CU may also be implemented using a high-speed Programmable Logic Controller (PLC) equipped with a high-speed Ethernet communications port. In another embodiment, a CU may be a high-speed computer or a PC.

Figure 6:
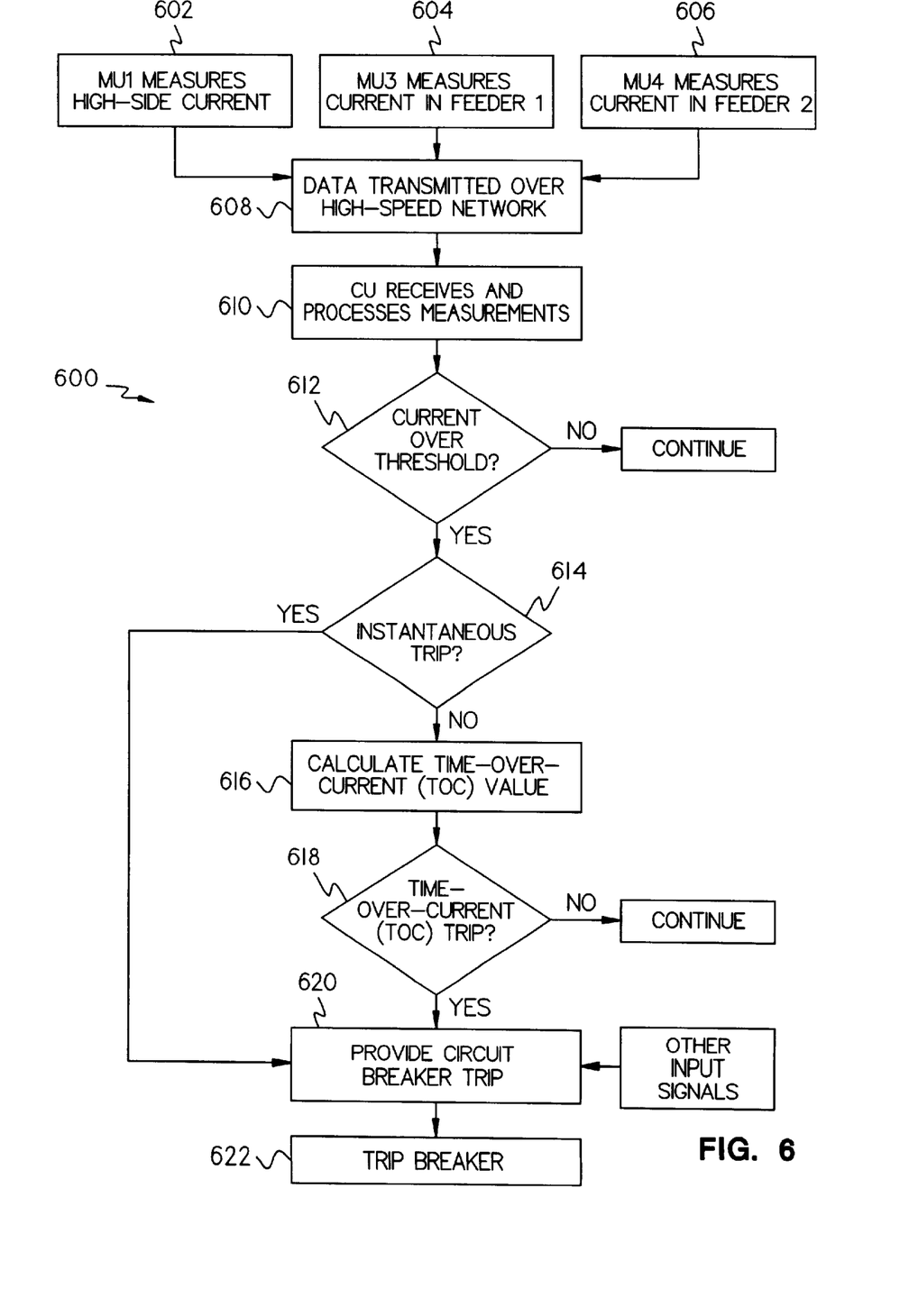
FIG. 6 is a flow chart illustrating an instantaneous over-current (OC) and a time-over-current (TOC) trip analysis as performed by the CU of the present invention.

FIG. 6 shows an exemplary method of CU 93 coordinating protection for system 70 shown in FIG. 2. For explanation purposes assume that a fault exists in feeder #1. All MUs may provide CU 93 with updated measurements of various parameters every cycle or less in method 600. Process 600 shows current being measured by each MU. By way of example, MU 1 measures current in the 128 kV transmission line (step 602), MU 3 measures current in feeder #1 (step 604) and MU 4 measures current in feeder #2 (step 606). The data are transmitted to CU 93 over the network (step 608). The CU receives and processes the measurements in step 610. The CU determines in step 612 whether any current from a MU exceeds a minimum threshold value (i.e. $I>I_{threshold}$) and in step 614 decides whether the current is high enough to initiate an instantaneous OC breaker trip. If so, a comparison may also be made of the relative current values provided by the other MUs and then a determination is made that the fault is in feeder #1. The CU may send a trip signal to circuit breaker 87, as shown in steps 620 and 622. If no current is of sufficient magnitude to initiate an instantaneous trip, on the other hand, current values may be integrated over time to derive Time-Over-Current (TOC) values in step 618. If a TOC value for the current in feeder #1 eventually exceeds a second predetermined threshold, the processor in step 618 may activate a circuit breaker trip.

Information, such as current from each MU, may be continuously provided to the CU for additional protection analysis. For example, after sending a trip signal, the processor may continue to examine the current values and, if circuit breaker 87 did not trip as a result of a breaker failure, circuit breaker 85 may then be tripped as a backup.

Additional protection may be provided by the processor examining current values through CT 72, CT 74, and CT 75 shown in FIG. 2. If the current flowing through CT 72 is substantially equal to the current flowing through CT 74 and CT 75 (corrected for phase and scaling factors), then the current flowing into feeder #1 is proper. If it is determined that the current through CT 72 is not equal to the currents through CT 87 and CT 88, then the likely cause is a feeder bus fault or transformer fault. Thus, the processor of the CU may perform protective functions similar to that provided by a conventional differential relay.

Figure 7:
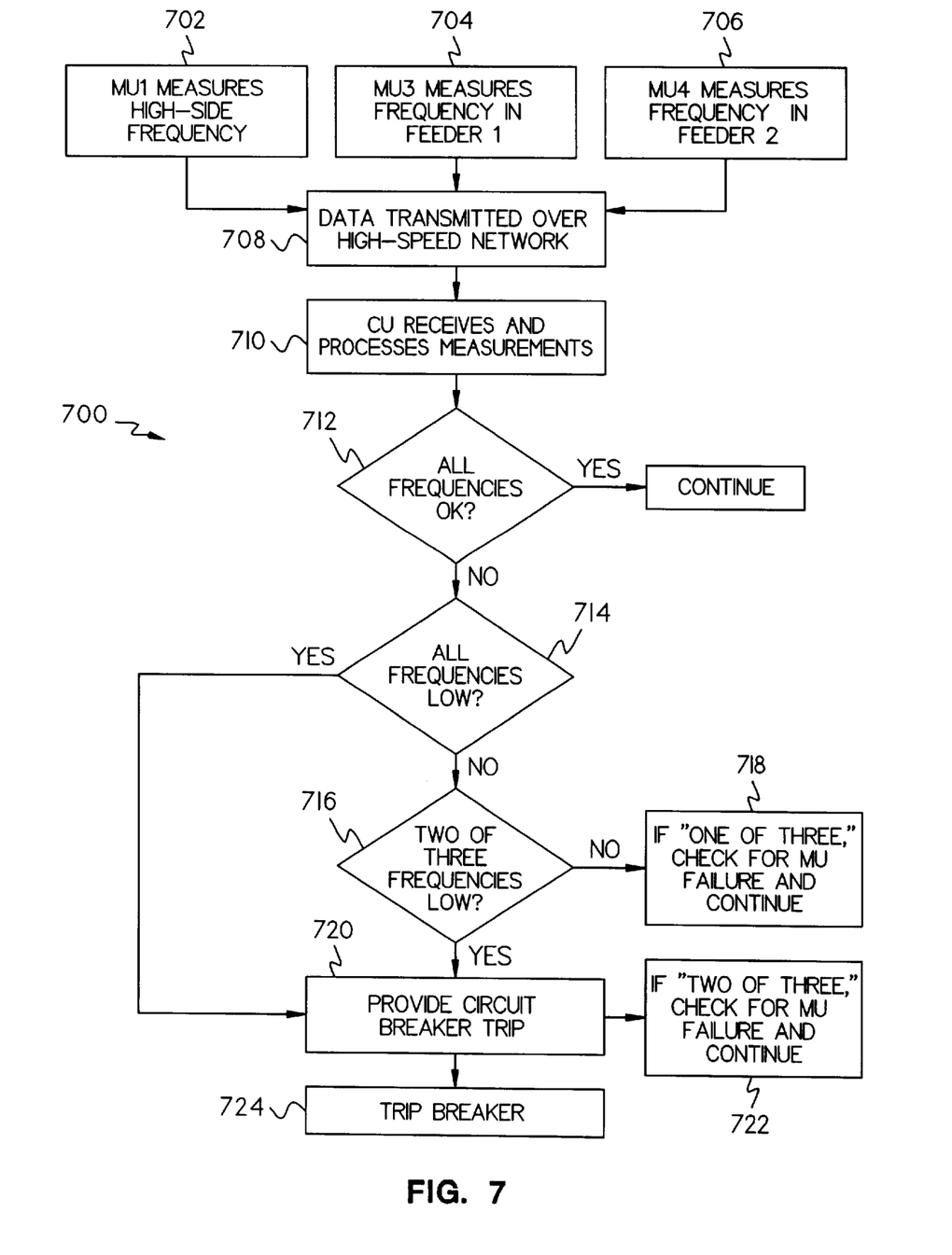
FIG. 7 is a flow chart illustrating a under/over frequency trip analysis as performed by the CU of the present invention.

Each MU may also provide frequency measurements to CU 93 via the high-speed network. As the frequency within a power network should be substantially constant within all circuits, the CU may compare the frequency measurements provided by each MU. If the frequency from each MU is out of tolerance, but all the frequencies are substantially similar to each other, the CU may initiate tripping of the circuit breaker that is ahead in the hierarchy of circuit breakers in the network. FIG. 7 is a flowchart of method 700 as an example of analyzing frequency measurements obtained from three MUs and determining that a circuit breaker should be tripped.

As shown, MU 1, MU 3 and MU 4 measure frequency through the 128 kV transmission line, feeder #1 and feeder #2, respectively (FIG. 2). These steps are designated 702, 704 and 706. As discussed before, the measurements are provided to CU 93 over the high speed network (step 708) and analyzed (step 710). In step 712, if all the frequencies are within tolerance, or within a predetermined range of values, the processor may decide not to trip any circuit breaker. If the processor determines that all the frequencies are low and out of tolerance, a command may trip circuit breaker 85 (steps 720 and 724), which is ahead in the hierarchy with respect to circuit breakers 87 and 88.

In the embodiment shown in FIG. 7, there is also provided steps 716, 718 and 722 by the processor for voting among the frequency measurements provided from the three MUs. The voting may help add confidence to a decision to trip the breaker. If all three frequency values agree (out of the three, for example, provided by the MUs), a decision to disconnect the 128 kV transmission line may have a higher probability of being a correct decision. If one value or two values do not agree with the group of three values, the processor may conclude that there may be a problem with one or two MUs, thereby triggering further investigation.

Analyzing MU measurements by the processor in the CU may be used advantageously in developing other protective methods in which conditions for an action, such as tripping a circuit breaker, depend on a combination of measurements obtained from multiple circuits. Consider, for example, conditions in the power network of FIG. 2 in which a steady-state current (or power) flowing through feeder #2 is higher than a steady-state current (or power) flowing through feeder #1. Also assume, for example, that both steady-state currents are below a predetermined trip threshold. If the combined power flowing through feeders #1 and #2 are each below the limit that may be supplied by power transformer 91, then the trip setting of feeder #2 may be increased by the CU. In this manner, feeder #2 may safely continue to supply a heavier load with a lower risk of an unwanted circuit trip. In effect, the protective method for feeder #2 retains a primary dependency on any faults that may occur in feeder #2, but may also add a secondary dependency on measurements from collateral circuits, for example feeder #1.

Figure 8:
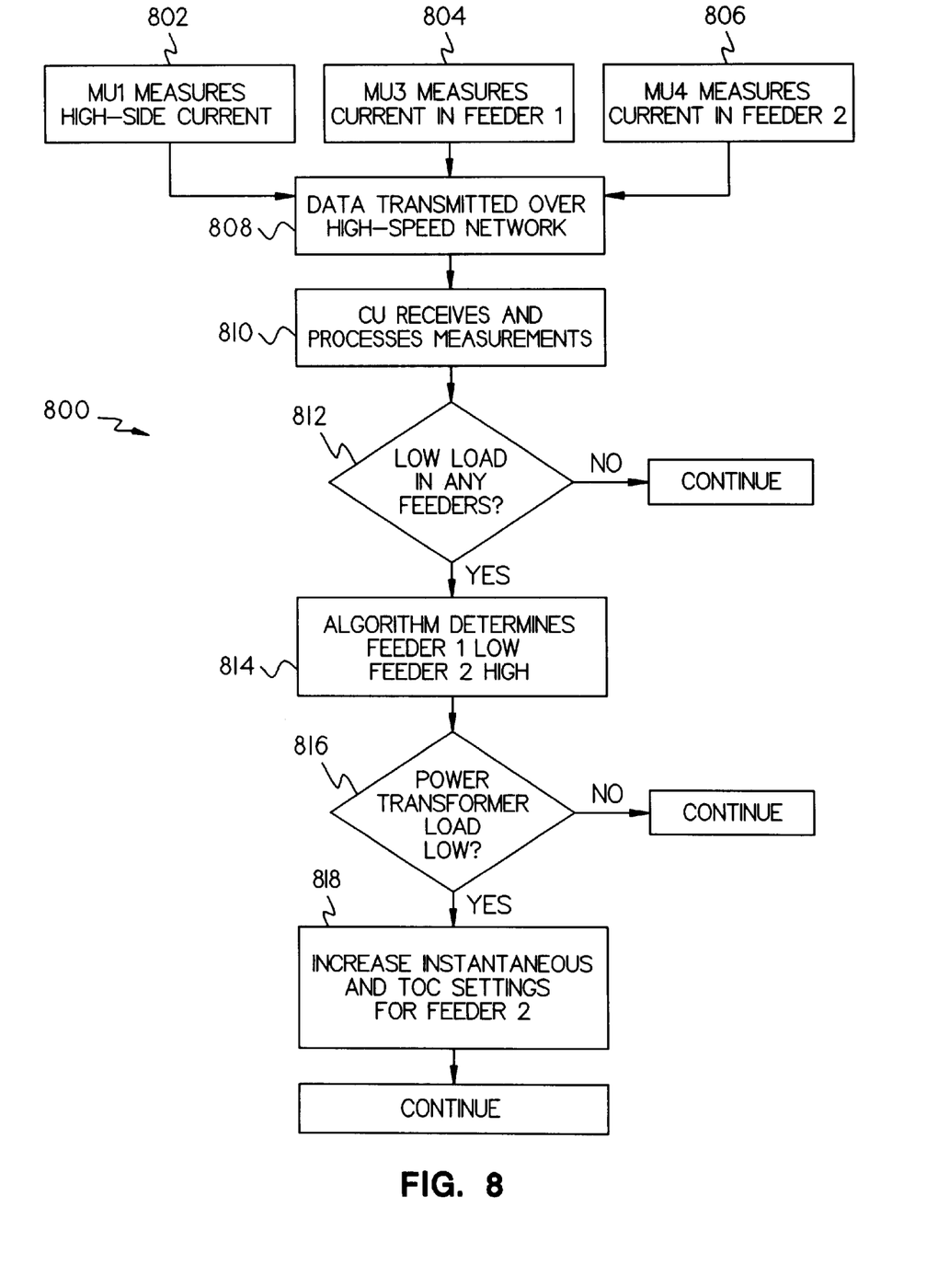
FIG. 8 is a flow chart illustrating a method for dynamically adjusting circuit breaker tripping thresholds as performed by the CU of the present invention.

FIG. 8 is a flowchart illustrating an exemplary embodiment of a joint dependency protective method 800. Steps designated 802 through 810 have been described previously. In step 802, it has been assumed that MU 1 is measuring a high level of current in the 128 kV line. In steps 812 and 814 the processor determines that the load of feeder #1 is low and the load of feeder #2 is high, for example. It will be understood that the processor of CU 93 has the current load limit data on the power transformers and the feeder lines in network 70. In step 816, the processor determines that the actual load being supplied by power transformer 91 (total current in feeders #1 and #2) is lower than a predetermined threshold. As a result, the instantaneous trip setting and the TOC trip setting for feeder #2 may be increased in step 818. In this manner, tripping thresholds may be adjusted dynamically in the monitoring and protection system of the present invention.

Figure 9:
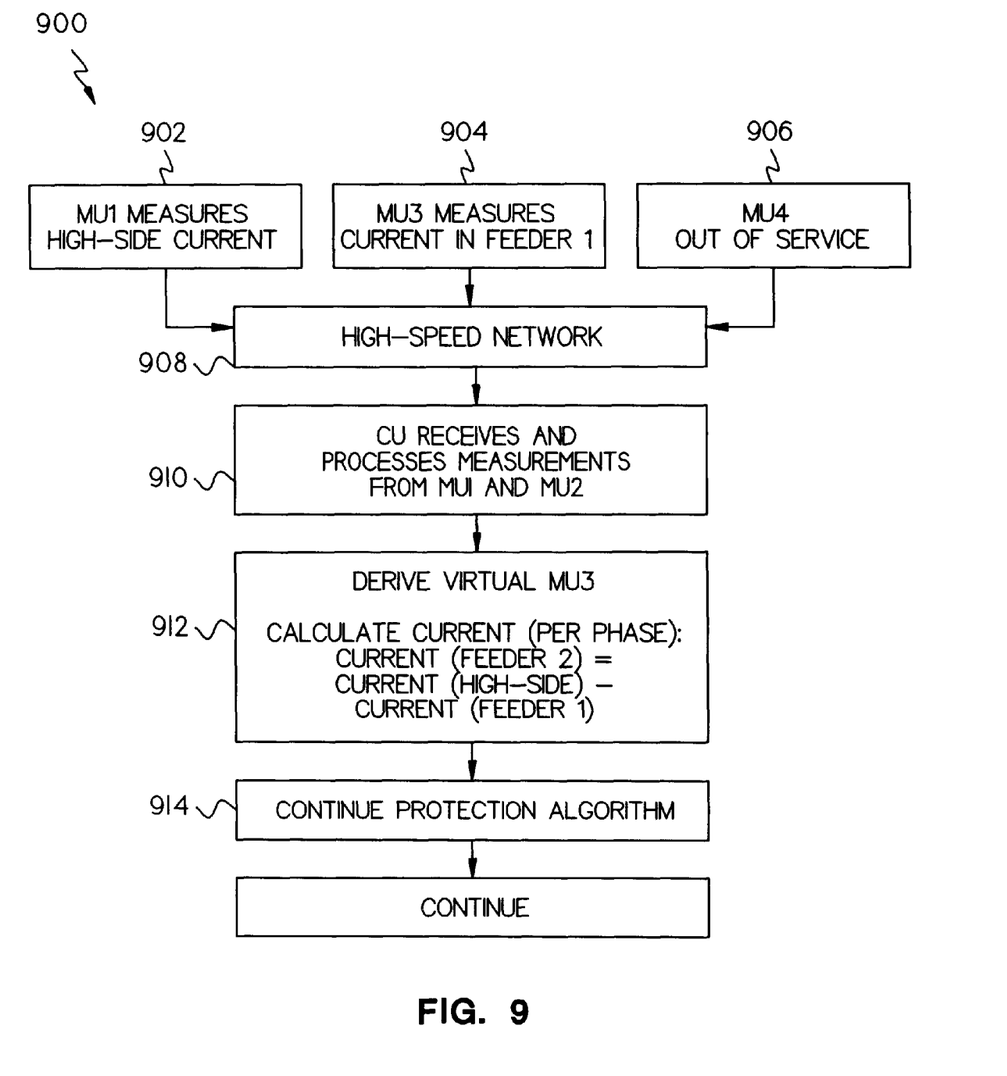
FIG. 9 is a flow chart illustrating a method for obtaining virtual measurements of a MU, as performed by the CU of the present invention.

In yet another embodiment of the present invention method 900, illustrated in FIG. 9, provides protection to a power network even when a MU is disabled. Steps 902 through 910 are similar to steps 802 through 810 described previously, except that MU 4 is disabled or otherwise out of service. Under these conditions, the processor of CU 93, performs steps 912 and 914. Steps 912 obtains substitute values of power, current, and other parameters normally provided by MU 4. The substitute values may be based on near-simultaneous measurements provided from MU 1 and MU 3. For example, the substitute current value flowing through feeder #2 may be based on a sum of currents per phase (including a neutral phase, if any) entering and leaving a common node in the system. Thus, using common node 99 (FIG. 2), for example, then the sum of all currents entering and leaving node 99 should be substantially zero. Subtracting the current provided by MU 2 from the current provided by MU 1 on a phase by phase basis, provides the values of the current in feeder #2. In this manner, a virtual MU is created as a substitute for the failed MU 4. Since the virtual MU may provide the same values as the real MU 4, step 914 of the processor continues its protection analysis as if MU 4 had not failed.

It will be appreciated that the virtual method described in FIG. 9 may allow for a reliability check on values provided by real MUs. For example, a CU may calculate various parameter values (normally calculated by MU 4) based on measurements provided by MU 1 and MU 3. The calculated values may then be compared to the measurements provided by MU 4 to verify proper operation of MU 4. In a similar manner, this method may be used as a periodic check on the performance of other MUs in the protection network.

Figure 10:
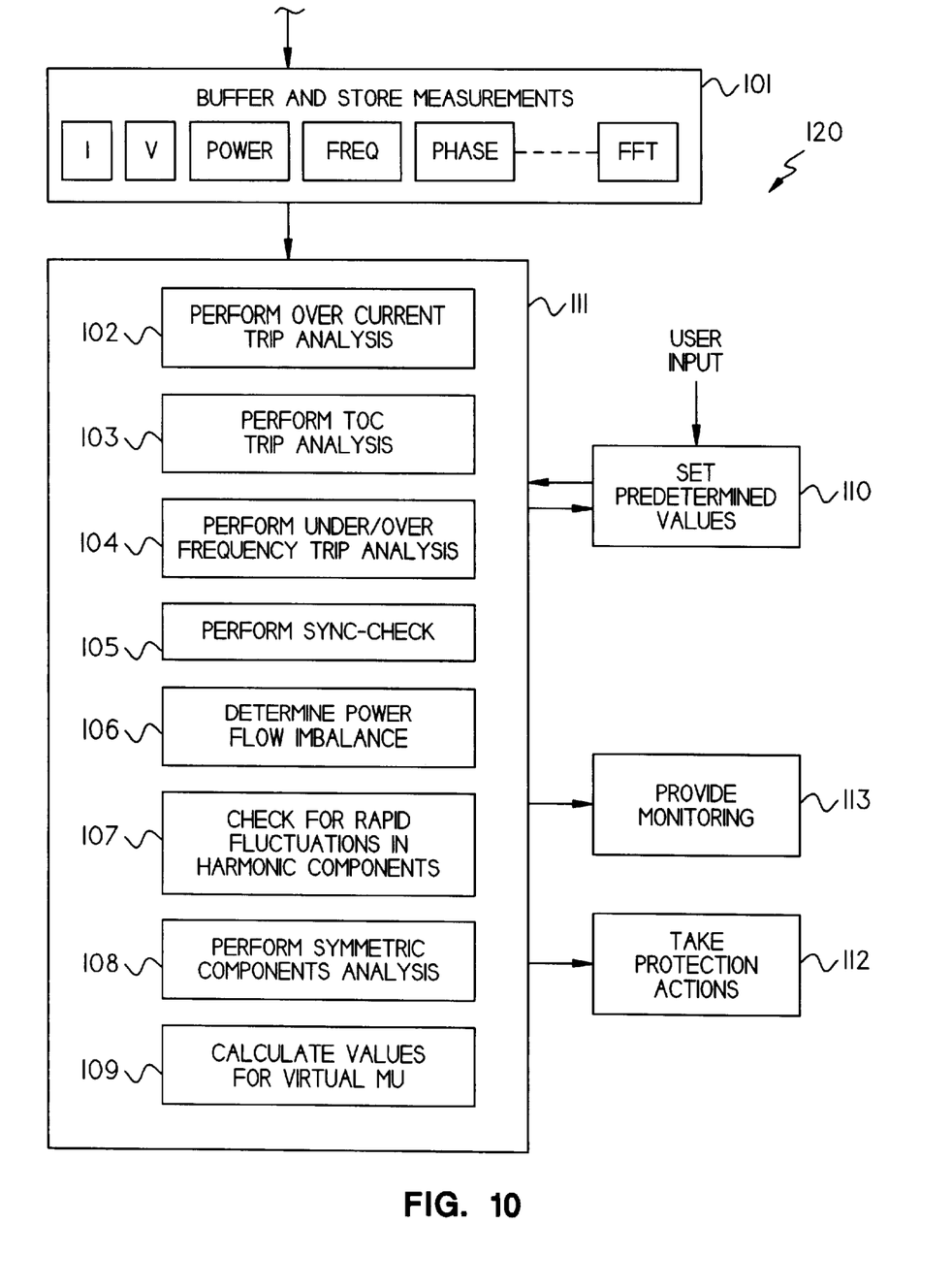
FIG. 10 is a block diagram of the protection modules included in the CU of the present invention.

Table 2 lists protective and control functions that may be performed by the monitoring and protection system of the present invention. These functions will now be described by referring to FIG. 10 illustrating method 120 of processor 508 of the CU. As shown, in step 101 the processor stores and buffers measurements received from one or several MUs by way of communications module 502. The measurements stored and buffered may be, for example, current, voltage, power, frequency, phase, etc. The processor may execute several algorithms, designated generally as 111, to determine health status of the power network, identify and isolate faults, take protective actions and provide monitoring output to a user. Some of the steps performed in the algorithms are described below. It will be appreciated that the processor need not perform all the described steps, nor does the processor need to perform the steps in the order shown in FIG. 10.

TABLE 2

Examples of Protective Functions and Control of a Monitoring and Protection System 1. Protective Functions (also performed by conventional relays):
   a) Over-current, time-over-current (TOC), voltage sags, differential currents, differential voltages, under-frequency, over-frequency, ground and neutral fault current, synch-check, etc.
   b) Protective functions listed in (a) that are based on fundamental or selected harmonic components of voltage and current in each phase and neutral/ground.
   c) Directional current protection functions based on high-speed calculation of directional power-flow, phase angles, and/or symmetric components.
   d) Fault location based on measurement of fault currents, voltages, line impedances.
   e) Capacitor bank protection.
2. Control Functions for Protection of Devices in a Distributed Power Network:
   a) Voltage control using tap-change-under-load algorithms.
   b) Control to synchronize power generators.
   c) Capacitor bank control to manage voltage and reactive power flow (VARS).
3. Power Quality Measurements:
   a) Voltage sags and peaks.
   b) Measurement of harmonics.
4. Power and Load Management:
   a) Measurement and characterization of transformer losses.
   b) Measurement of load (feeder) balance.
5. Protection Based on Shared Measurements:
   a) Protection based on virtual measurements from a virtual MU (described before).
   b) Dynamic protection (primary, secondary dependencies) based on both local and remote conditions (LAN and WAN systems).
   c) Proactive sequencing of protective actions (coordination).
   d) Real-time inputs to power system models for stability analysis.

Over-current Trip (step 102)—As described before, a MU may measure and update current values every cycle or less and send the updated values to a CU every cycle or less. If any current exceeds a predetermined threshold value for more than a predetermined time, the CU may initiate a sequence of protective actions. Since the CU has immediate access to values being measured by a plurality of other MUs in the network, the algorithms in the CU may take into consideration the measurements also provided by the other MUs. Accordingly, the CU may immediately initiate a command to trip a protective circuit breaker, or may wait for other events to occur before tripping the circuit breaker.

Time-over-current (TOC) Trip (step 103)—The CU may receive new measurements from a plurality of MUs every cycle or less. If a measured current from a specific MU exceeds a predetermined value (i.e. a "pickup current"), the CU may then begin integrating successive current measurements from that CU over a predetermined time interval. The integrated current values may be compared with a TOC curve stored in the CU. It will be appreciated that TOC curves are well known and are typically described as having Inverse characteristics, Highly Inverse characteristics, etc. If the integrated current exceeds a predetermined threshold value or values established by the TOC curve, protective action (as described above, for example) may be initiated by the CU.

Under/over Frequency Trip (step 104)—The CU may receive updated frequency measurements from a plurality of MUs every cycle. If a measured frequency from a MU falls outside a predetermined band limit for a predetermined time, protective action to trip one of the circuit breakers may be initiated by the CU. As described before, the protective action may be based on frequency measurements from several MUs in order to increase reliability in the decision to trip a circuit breaker.

Sync-check (step 105)—A plurality of MUs may provide voltage, phase, and frequency measurements to the CU. These measurements may be used by the CU to confirm that measured values on each side of a circuit breaker are within predetermined limits. It will be appreciated that before a circuit breaker is closed there may be a high voltage differential across the circuit breaker. When the circuit breaker is closed, however, the voltages on either side of the breaker attempt to rapidly equalize. By first comparing voltage values on each side of a circuit breaker, the CU may prevent equipment damage caused by high voltage differentials across the breaker. Thus, before allowing a breaker to close, an algorithm may be provided in the CU to verify that measured values on each side of a breaker are within predetermined limits.

Differential voltages, currents and power flow imbalances (step 106)—Multiple MUs may provide voltage, current and power-flow measurements to the CU. Conventional protection strategies rely on differential voltages, currents, and power flows to initiate protective actions. For example, power flowing into a transformer should substantially equal the power flowing out of a transformer (except for small heating losses). If this is not true, a cause may be transformer failure. An algorithm to determine power flow imbalance between any two nodes in the power network may be provided and executed by the CU. Protective measures provided by such an algorithm may be, for example, setting alarms and/or initiating (automatically) protective action to trip a circuit breaker.

Fundamental and harmonic components—The MU may perform Fast Fourier Transforms (FFT) calculations of the voltage and current signals coming into the MU. The FFT calculation may be performed in one cycle, thereby also providing current and voltage signals in terms their fundamental and harmonic components. The MU may send these signals to the CU. An algorithm may be provided in the CU to filter all harmonics and use only the fundamental components of a signal or all the components of the signal in deciding what protective action to take. The algorithm (step 107) in the CU may also check for rapid fluctuations in the harmonic components of a signal. As known, rapid fluctuations in harmonic contents of current or voltage may indicate that a hardware failure has occurred in the power network.

In addition, capacitor banks are conventionally used to correct for power factor throughout the power network. Large fluctuations in the harmonic components of current flowing through a shunt capacitor bank may be associated with a capacitor failure. Thus, continuous measurement by the MU and continuous analysis by the CU of fundamental and harmonic components of a current signal may provide means for detecting a capacitor failure.

Symmetric component analysis (step 108)—Symmetric components are mathematically computed by a known transform using current and voltage phasors in three-phase electrical systems. This transform produces three components: 1) positive sequence, 2) negative sequence and 3) zero sequence. The three components may be used to calculate line impedances and to study the theoretical impact of failures at various locations on a transmission or distribution system. Conventional microprocessor-based protective relays may use symmetric components for distinguishing among several types of faults and their locations. In the monitoring and protection system of the present invention, a MU may calculate and provide the CU with symmetric component values. The CU may then analyze the symmetric components for possible fault detection and isolation, as well as protective action.

Calculations for a virtual MU (step 109)—As described before, the processor may calculate values for a non-operational MU by performing circuit node analysis (the sum of all currents at a node should substantially equal zero). By performing node analysis, values may be substituted for the measurement parameters that would have been obtained from the MU had the MU been functional.

Dynamic protection algorithms—Other protection algorithms may be provided in the CU. For example, a dynamic protection algorithm may be provided which adjusts a decision based on dynamic changes in the power network. Thus, TOC curves, time constants, pickup thresholds, and other predetermined values used by the processor in the CU to reach a decision may be adjusted (step 110).

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A distributed monitoring and protection system for a distributed power network comprising:
    a plurality of lines for distributing electric power, the lines including protective devices, and at least two of the lines connected to different current nodes at different potentials,
    an individual monitoring unit for measuring electrical parameters coupled to each of at least two of the lines, at least two of the monitoring units measuring electrical parameters from different current nodes at different potentials,
    at least one control unit communicating remotely over a high-speed data network with each monitoring unit,
    at least one monitoring unit coupled to a protective device, the at least one control unit including a processor for (a) comparing in the control unit the measured electrical parameters of one respective monitoring unit with the measured electrical parameters of at least one other respective monitoring unit, and (b) producing in the control unit an activating signal based on the comparison of the measured electrical parameters of the one respective monitoring unit with the measured electrical parameters of the at least one other respective monitoring unit, and
    the control unit transmitting the activating signal to the at least one monitoring unit, and in response, the at least one monitoring unit producing a tripping signal for tripping the protective device.

2. In a distributed power network having a plurality of power lines wherein at least two of the power lines are connected to different current nodes at different potentials and each power line includes a protective device, a method for activating a protective device comprising the steps of:
    (a) measuring electrical parameters by respective monitoring units in at least two of the power lines connected to different current nodes at different potentials;
    (b) transmitting at high speed the measured electrical parameters from the respective monitoring units to a remotely located control unit;
    (c) comparing in the control unit the measured electrical parameters of one respective monitoring unit with the measured electrical parameters of at least one other respective monitoring unit;
    (d) producing in the control unit an activating signal based on the comparison of the measured electrical parameters of the one respective monitoring unit with the measured electrical parameters of the at least one other respective monitoring unit; and
    (e) transmitting the activating signal from the control unit to a monitoring unit for producing a tripping signal based on the activating signal, and
    (f) tripping a protective device by the monitoring unit in response to the tripping signal.

* * * * *